UNITED STATES PATENT OFFICE.

CURT JULIUS ROEHR, OF PHILADELPHIA, PENNSYLVANIA.

TREATING BREWERS' AND DISTILLERS' SLOP.

No. 823,366. Specification of Letters Patent. Patented June 12, 1906.

Application filed March 13, 1905. Serial No. 249,935.

*To all whom it may concern:*

Be it known that I, CURT JULIUS ROEHR, a citizen of the United States, residing in Philadelphia, Pennsylvania, have invented certain Improvements in Treating Brewers' and Distillers' Slop, of which the following is a specification.

The object of my invention is to recover from brewers' or distillers' slob ingredients of the same which are valuable in the art, but which are now permitted to run to waste. This object I attain by first precipitating the protein and fibrous matters contained in the slop by adding thereto an alkaline solution of mineral matter which is insoluble in water and then subjecting the slop thus treated to the action of a filter-press, whereby the precipitated matters can be readily separated from the clear liquid, the latter containing glycerin, dextrin, and other gums and combinations of organic acids with sodium oxid. This clear liquid can then be concentrated by evaporation to a syrup-like form, and in this condition will constitute a valuable addition to sizing compounds for textile purposes, dye solutions, pastes, soaps, &c., or, if desired, the component parts of the liquid may be readily separated from each other by the employment of well-known means.

As an instance of one method of carrying out my invention which has proven to be effective in practice I may state that I have added to two thousand pounds of slop heated to a temperature of about two hundred (200) degrees Fahrenheit a solution of ten pounds of silicate of soda in twelve and one-half gallons of water. The effect of this treatment is twofold, the chemical reaction between the lactic acid of the slop and the alkali freeing from the latter the mineral matter and also freeing from the acid the protein held in solution or distribution therein, both the protein and mineral matter being precipitated and the protein being deposited upon said mineral matter in such manner that it will not interfere with proper filtering action. After such precipitation has been completed the slop is subjected to the action of a filter-press of any desired character through which the clear liquor will pass, leaving behind a solid cake of the residue.

Instead of using a solution of silicate of soda I may use a solution of hydroxid of aluminium or zinc in caustic soda of patash or a solution of hydroxid of copper, zinc, nickel, cobalt, or silver, for example, in ammonia, or I may use other metallic oxids which are soluble in alkali, but insoluble in water, and to reduce the cost of the process partial neutralization of the slop may be effected before the treatment of the same in the manner before described, a cheap and simple method of effecting such partial neutralization being the use of any cheap metal or hydroxid of metal soluble in lactic acid, but insoluble in water. For instance, the slop may be caused to flow, in the first instance, over or through zinc scraps, whereby the action of the zinc or zinc oxid will effect a partial neutralization of the slop. The strength of the alkaline solution may also vary, depending upon the character of the slop under treatment.

I do not in this application claim the process for recovering from brewers' or distillers' slop the protein and fatty matters contained therein, as herein disclosed, as this forms the subject-matter of my copending application filed January 9, 1905, Serial No. 240,355.

Having thus described my invention, I claim and desire to secure by Letters Patent—

1. The mode herein described of recovering glycerin, dextrin, or the like and lactic acid, from brewers' or distillers' slop, said mode consisting in first precipitating the protein contents of the slop by subjecting the same while it is maintained in a heated condition to the action of mineral matter dissolved in alkali, which mineral matter is not soluble in water, then separating the clear liquor from the precipitate, and then without material dilution of said liquor concentrating the latter by evaporation, substantially as specified.

2. The mode herein described of recovering glycerin, dextrin, or the like, and lactic acid, from brewers' or distillers' slop, said mode consisting in first precipitating the protein contents of the slop by subjecting the same while maintained in a heated condition to the action of mineral matter dissolved in an alkali, said mineral matter being insoluble in water, then separating the clear liquor from the precipitate by filtration, and then concentrating said liquid, substantially as specified.

In testimony whereof I have signed my name to this specification in the presence of two subscribing witnesses.

CURT JULIUS ROEHR.

Witnesses:
WILL. A. BARR,
JOS. H. KLEIN.

---

Correction in Letters Patent No. 823,366.

It is hereby certified that in Letters Patent No. 823,366, granted June 12, 1906 upon the application of Curt Julius Roehr, of Philadelphia, Pennsylvania, for an improvement in "Treating Brewers' and Distillers' Slop," an error occurs in the printed specification requiring correction, as follows: In line 9, page 1, the word "slob" should read *slop;* and that the said Letters Patent should be read with this correction therein that the same may conform to the record of the case in the Patent Office.

Signed and sealed this 26th day of June, A. D., 1906.

[SEAL.]

E. B. MOORE,
*Acting Commissioner of Patents.* contents of the slop by subjecting the same while maintained in a heated condition to the action of mineral matter dissolved in an alkali, said mineral matter being insoluble in water, then separating the clear liquor from the precipitate by filtration, and then concentrating said liquid, substantially as specified.

In testimony whereof I have signed my name to this specification in the presence of two subscribing witnesses.

CURT JULIUS ROEHR.

Witnesses:
WILL. A. BARR,
JOS. H. KLEIN.

---

It is hereby certified that in Letters Patent No. 823,366, granted June 12, 1906 upon the application of Curt Julius Roehr, of Philadelphia, Pennsylvania, for an improvement in "Treating Brewers' and Distillers' Slop," an error occurs in the printed specification requiring correction, as follows: In line 9, page 1, the word "slob" should read *slop;* and that the said Letters Patent should be read with this correction therein that the same may conform to the record of the case in the Patent Office.

Signed and sealed this 26th day of June, A. D., 1906.

[SEAL.]

E. B. MOORE,
*Acting Commissioner of Patents.*

Correction in Letters Patent No. 823,366.

It is hereby certified that in Letters Patent No. 823,366, granted June 12, 1906 upon the application of Curt Julius Roehr, of Philadelphia, Pennsylvania, for an improvement in "Treating Brewers' and Distillers' Slop," an error occurs in the printed specification requiring correction, as follows: In line 9, page 1, the word "slob" should read *slop;* and that the said Letters Patent should be read with this correction therein that the same may conform to the record of the case in the Patent Office.

Signed and sealed this 26th day of June, A. D., 1906.

[SEAL.]

E. B. MOORE,
*Acting Commissioner of Patents.*